United States Patent
Arends et al.

(10) Patent No.: US 9,011,951 B2
(45) Date of Patent: Apr. 21, 2015

(54) CRYOGENIC SPRAY PROCESS

(75) Inventors: Berend Jan Arends, Vlaardingen (NL); Christiaan Michaël Beindorff, Vlaardingen (NL); Johannes Jozef M Janssen, Vlaardingen (NL); Teunis de Man, Vlaardingen (NL)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 13/825,571

(22) PCT Filed: Sep. 9, 2011

(86) PCT No.: PCT/EP2011/065601
§ 371 (c)(1),
(2), (4) Date: Mar. 22, 2013

(87) PCT Pub. No.: WO2012/041682
PCT Pub. Date: Apr. 5, 2012

(65) Prior Publication Data
US 2013/0192278 A1    Aug. 1, 2013

(30) Foreign Application Priority Data
Sep. 29, 2010 (EP) .................................... 10181979

(51) Int. Cl.
| | |
|---|---|
| A23D 9/05 | (2006.01) |
| C11B 15/00 | (2006.01) |
| F25D 31/00 | (2006.01) |
| A23D 7/00 | (2006.01) |
| A23D 7/01 | (2006.01) |
| A23D 7/02 | (2006.01) |
| A23D 7/05 | (2006.01) |

(52) U.S. Cl.
CPC ................ *F25D 31/00* (2013.01); *A23D 7/001* (2013.01); *A23D 7/003* (2013.01); *A23D 7/013* (2013.01); *A23D 7/02* (2013.01); *A23D 7/05* (2013.01); *A23D 9/05* (2013.01)

(58) Field of Classification Search
None
See application file for complete search history.

(56) References Cited

U.S. PATENT DOCUMENTS

| | | | | |
|---|---|---|---|---|
| 6,106,885 A | * | 8/2000 | Huizinga et al. | 426/607 |
| 6,159,525 A | * | 12/2000 | Lievense et al. | 426/603 |
| 6,171,636 B1 | * | 1/2001 | Sassen et al. | 426/603 |
| 6,531,173 B2 | * | 3/2003 | Brooker | 426/524 |
| 2003/0064141 A1 | * | 4/2003 | Brooker | 426/524 |

FOREIGN PATENT DOCUMENTS

| | | |
|---|---|---|
| EP | 0393963 A2 | 10/1990 |
| EP | 1285584 A2 | 2/2003 |
| EP | 1651338 B1 | 5/2006 |
| EP | 2181604 A1 | 5/2010 |

(Continued)

OTHER PUBLICATIONS

Nutrition: Today's challenges and opportunities, Leatherhead Food International, Jun. 2008, vol. 42 No. 5, pp. 1-6.

(Continued)

*Primary Examiner* — Carolyn Paden
(74) *Attorney, Agent, or Firm* — Gerard J. McGowan, Jr.

(57) ABSTRACT

The invention relates to a spray crystallization process for making solid particles suitable for structuring an oil containing dispersion, solid particles obtainable by said process and use of said particles for structuring oil containing dispersions.

14 Claims, 1 Drawing Sheet

(56) References Cited

FOREIGN PATENT DOCUMENTS

| GB | WO98/13133 | * | 4/1998 |
| GB | WO2005/051089 | * | 11/2004 |

OTHER PUBLICATIONS

The prilling process with liquid nitrogen, Jet Priller, Jun. 23, 2010, pp. 1-2.

Davidsson, Powdered fats for soups and sauces—and a range of other food products, Food Ingredients and Analysis International, 2001, vol. 23, No. 4, pp. 29-30).

PCT International Search Report in PCT application PCT/EP2011/065601 dated Oct. 21, 2011 with Written Opinion.

European Search Report in EP application EP 10 18 1979 dated Nov. 17, 2010.

Elvers et al, Margarines and shortenings, Ullmanns Encyclopedia of Industrial Chemistry, 1990, 156-158, 5th Edition, vol. A16.

Van Den Enden, A method for the determination of the solid phase content of fats using pulse nuclear magnetic resonance, Fette Seifen Anstrichmittel, Sep. 23, 1977, 180-186, 80.

Written Opinion in EP10181979, Nov. 11, 2010.

* cited by examiner

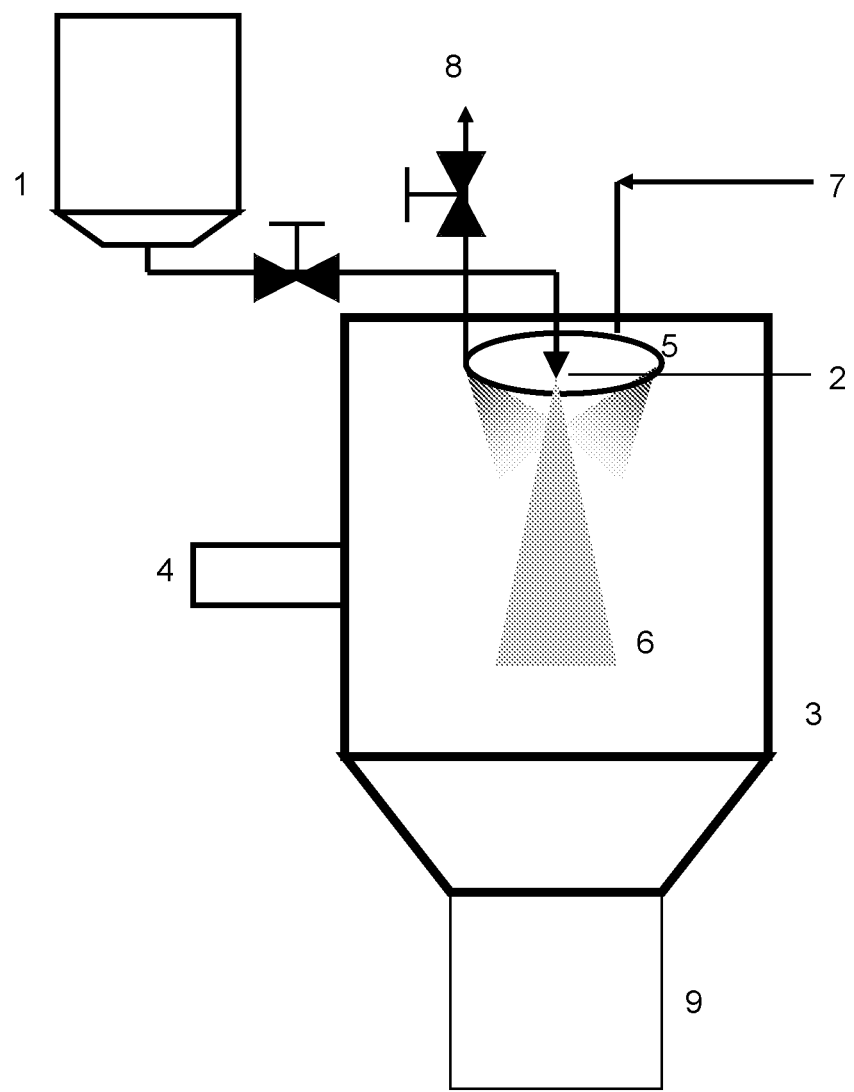

CRYOGENIC SPRAY PROCESS

FIELD OF THE INVENTION

The present invention relates to a cryogenic spray process for making solid particles and use of said particles for structuring oil containing dispersions.

BACKGROUND OF THE INVENTION

Edible dispersions comprising oil and structuring agent are well known in the art and include for example shortenings comprising a fat phase and water in oil spreads like margarine comprising a fat phase and an aqueous phase.

The fat phase of margarine and similar edible fat continuous spreads is often a mixture of liquid oil (i.e. fat that is liquid at ambient temperature) and fat which is solid at ambient temperatures. The solid fat, also called structuring fat or hardstock fat, serves to structure the fat phase (being the case for example in a shortening as well as in a water in oil emulsion) and helps to stabilize the aqueous phase, if present, by forming a fat crystal network. For a margarine or spread, ideally the structuring fat has such properties that it melts or dissolves at mouth temperature. Otherwise the product may have a heavy and/or waxy mouthfeel.

Important aspects of a fat continuous spread like for example margarine and low fat spread, the low fat spread usually comprising from 10 to 40 wt % fat on total composition, are for example hardness, spreadibility, the amount of water released after spreading (i.e. free water) and ability to withstand temperature cycling. Temperature cycling means that the product is subjected to low and high temperatures (e.g. when the consumer takes the product out of the refrigerator and leaves it for some time at the table to use it). This may have a negative influence on the structure of the spread (like for example destabilization of the emulsion or oil-exudation).

Generally edible fat continuous food products like for example margarines and similar edible fat continuous spreads are prepared according to known processes that encompass the following steps:
1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

A disadvantage of these processes is that the complete composition (including the liquid oil, structuring fat and if present the aqueous phase) is subjected to a heating step and a cooling step. This requires a lot of energy. For a spread comprising for example 6 wt % structuring fat the whole composition (100 wt %) has to be heated and cooled.

Another disadvantage of the known processes is that the choice of fats that can practically be used as structuring agent is rather limited. If the melting point of the structuring agent is too high the melting properties in the mouth are unsatisfactory. If on the other hand, the melting point is too low, the emulsion stability will be negatively affected. Moreover the amount of saturated fatty acids (SAFA) in the structuring agent is usually relatively high. Also trans fatty acid may be present. Some experts have called for reductions in these fatty acids to improve cardiovascular health.

Some consumers prefer spreads that have a low energy density (for example products that are low in total fat) and/or are low in SAFA but still have a good nutritional profile (by providing for example essential fatty acids like omega-3 and omega-6).

A further disadvantage of the known processes is that the product may deteriorate due to the changes in temperature caused by the heating and cooling step.

Alternative processes have been described wherein the structuring fat is added as fat powder (i.e. crystallized fat) thereby eliminating the need to heat the whole composition to above the melting temperature of the structuring fat.

EP 1 651 338 A1 discloses a process for the preparation of an edible dispersion like for example margarine, wherein the dispersion is formed by mixing oil, solid structuring agent particles and an aqueous phase and/or solid phase. The solid structuring agent particles have a microporous structure of submicron size particles. Said particles can be prepared using a micronisation process. The particles have a microporous structure which may result in low bulk density powders. Such powders are not always convenient to handle in a production environment.

EP 1 285 584 A2 describes a method of producing a food product formulation having plasticity or firmness comprising or consisting of a uniform dispersion of crystalline solid fat in an oil phase comprising bringing the solid fat phase with a minimal amount of the oil phase in a liquid state to a cooling device employing cryogenic spray crystallization and therein cooling the molten fat using a cryogenic medium to effect fat crystallization as quickly as possible. No details are given regarding the process conditions of the cryogenic spray crystallization.

Food Ingredients and Analysis International Vol. 23 No. 4 pages 29-30 (2001) describes powdered fats based on cryogenic technology that can be used for example in pourable margarines and different types of soft fat spreads. It is however mentioned that powdered fats may be used in combination with liquid oil, but for optimal performance these products need a specially designed fat composition which is crystallized from the melt. This will give the best structure of the crystal fraction, and allows a stabilizing network of crystals to be formed during cooling.

EP 0 393 963 A2 describes a method for cryogenic crystallization of fat comprising introducing a fine downwardly directed spray of atomized liquid fat into the upper portion of a mixing chamber while directing a plurality of fine jets of cryogenic liquid against the downward spray of liquid fat droplets. The fat is sprayed at a pressure of about 2.7 bar. No further details are given regarding the process conditions of the cryogenic spray crystallization.

EP 2 181 604 A1 describes a method of preparing a fat powder suitable for structuring agent e.g. in margarines wherein a structuring agent comprising composition is sprayed from a pressurized container into an environment, thereby expanded and then treated with a coolant. The pressure difference is 4-40 MPs.

SUMMARY OF THE INVENTION

We have found that using fat powder to make a fat continuous spread like for example a low fat spread may not always result in a spread of predictable and/or acceptable quality for the consumer on aspects like for example stability, structure or nutrition, and depends at least in part on the quality of the fat powder itself.

It is an object of the present invention to provide edible fat powders that can be used to make a fat continuous food product of predictable quality, more specifically to make a fat continuous spread, like for example a margarine or low fat spread, of predictable quality.

Another object of the invention is to provide edible fat powders that can be used to make a fat continuous food product with improved properties like spreadability and/or heat stability and/or hardness, more specifically to make a fat continuous spread, like for example a margarine or low fat spread, with improved properties like spreadability and/or heat stability and/or hardness.

Yet another object of the invention is to provide edible fat powders that are convenient to handle in a production environment.

We have found that one or more of the above objects is attained by solid particles suitable for structuring an oil containing dispersion prepared using a spray crystallization process utilizing specific process conditions.

Accordingly in a first aspect the invention relates to a spray crystallization process for making solid particles suitable for structuring an oil containing dispersion.

The invention also relates to solid particles obtainable by the spray crystallization process according to the invention.

Further the invention relates to the use of solid particles according to the invention for structuring an oil containing dispersion.

Spreads, for example low fat spreads, made with solid particles suitable for structuring an oil containing dispersion according to the invention have a better structure and/or are more stable, especially when the spread has been subjected to a heat stability test.

BRIEF DESCRIPTION OF THE DRAWING

FIG. 1 is a schematic representation of the spray crystallization set-up.

DETAILED DESCRIPTION OF THE INVENTION

Weight percentage (wt %) is based on the total weight of the composition unless otherwise stated. The terms 'fat' and 'oil' are used interchangeably. Where applicable the prefix 'liquid' or 'solid' is added to indicate if the fat or oil is liquid or solid at ambient temperature as understood by the person skilled in the art. The term 'structuring fat' refers to a fat that is solid at ambient temperature. Ambient temperature is a temperature of about 20 degrees Celsius.

A dispersion is herein defined as a system in which two or more phases that are insoluble or only slightly soluble are distributed in one another. The dispersion may be an emulsion, a suspension or foam or any combination thereof, it may be oil continuous, water continuous or bi-continuous. Preferably the dispersion is oil continuous, more preferably an oil continuous emulsion or oil continuous suspension. Where an aqueous phase is present it is preferably a dispersed aqueous phase.

The spray crystallization process for making solid particles suitable for structuring an oil containing dispersion according to the invention comprises:
preparing a molten mixture comprising a structuring agent;
subjecting the molten mixture to a first pressure $P1$;
expanding said mixture by spraying it through an orifice to an environment having a second pressure $P2$ thereby atomizing the molten mixture; and
contacting the atomized molten mixture with a cryogenic cooling medium;
wherein $P1$ is greater than $P2$ and wherein $P1$ minus $P2$ is equal to or greater than 20 bar.

We have found that spray crystallization utilizing these specific process conditions provides solid particles that have an improved ability to structure an oil containing emulsion.

Solid Particles

The solid particles according to the invention are powders at a temperature of about 5 degrees Celsius. The term 'powder' is defined as generally understood by the skilled person. The solid particles form a free flowing powder. Preferably the solid particles are edible solid particles.

Preferably the solid particles have a free flowing bulk density at 5 degrees Celsius of at least 100 gram/liter, like for example at least 125 gram/liter. Solid particles with a higher bulk density are preferred as they are convenient to handle, especially in a production environment where for example a compact design of the production line is preferred. Therefore, more preferably the free flowing bulk density at 5 degrees Celsius of the solid particles is at least 150 gram/liter, like for example 175 gram/liter; even more preferably at least 200 gram/liter, like for example at least 250 gram/liter; and still even more preferably at least 300 gram/liter, like for example at least 350 gram/liter.

Preferably the solid particles have a free flowing bulk density at 5 degrees Celsius that does not exceed 400 gram/liter, more preferably does not exceed 350 gram/liter and most preferably does not exceed 350 gram/liter.

Free Flowing Bulk Density (BDo)

The free flowing bulk density of the solid particles is measured at 5 degrees Celsius according to the following protocol.

A 1000 ml plastic measuring cylinder (width 64 mm, height of the one liter mark is 330 mm), a wide mouth plastic funnel (conical 15 cm, cylindrical 2.5 cm) and a metal scoop are cooled for at least 1 hour at 5 degrees Celsius.

The cylinder is placed on a balance and the balance is reset to zero.

The funnel is placed on the cylinder and the solid particles, having a temperature of 5 degrees Celsius, are added till the cylinder is full (i.e. 1000 ml) in about 3 to 4 scoops.

The funnel is carefully removed as to minimize any vibrations.

The cylinder with the fat powder is weighed. This weight is the free flowing bulk density of the solid particles (i.e. the weight of the cylinder with solid particles minus the weight of the empty cylinder).

Structuring Agent

The solid particles according to the invention are suitable for structuring an oil containing dispersion. If used for making a spread, the structuring agent present in the solid particles serves to structure the spread by providing at least part of the structuring fat for the spread.

The structuring agent thus preferably comprises structuring fat. More preferably the structuring agent consists of one or more structuring fats. Structuring fat as commercially available may comprise minor amounts of other components like for example monoglycerides that are naturally present and may likewise be present in the solid particles.

In addition to these naturally present components the solid particles may comprise additional components like for example emulsifier or liquid oil. It will be appreciated that care must be taken to prevent the properties of the solid particles to be detrimentally affected. For example, the presence of liquid oil may affect the ability to form a powder (e.g. may result in a sticky powder or no recognizable powder), depending on the structuring fat and the liquid oil as well as the amounts thereof. It is within the reach of the skilled person to determine without undue burden how much of the additional components may be present using common general knowledge.

As the solid particles must be suitable to provide structure to an oil containing dispersion, like for example a spread, it may be preferred not to include too many and/or too much of additional components that do not primarily add to the structuring ability of the solid particles, like for example protein and carbohydrates. Preferably the solid particles comprise not more than 20 wt % of protein and/or carbohydrates, more preferably not more than 15 wt %, even more preferably not more than 10 wt %, and still more preferably not more than 5 wt %. Most preferably no protein and carbohydrates are present.

The solid particles comprise structuring fat and preferably comprises at least 80 wt % of structuring fat, more preferably at least 85 wt %, even more preferably at least 90 wt %, still more preferably at least 95 wt % and most preferably at least 98 wt %. Most preferably the solid particles essentially consist of structuring fat.

Preferably the solid particles are an edible fat powder.

The structuring fat may be a single fat or a mixture of different fats. The structuring fat may be of vegetable, animal or marine origin. Preferably at least 50 wt % of the structuring fat (based on total amount of structuring fat) is of vegetable origin, more preferably at least 60 wt %, even more preferably at least 70 wt %, still more preferably at least 80 wt %, even still more preferably at least 90 wt % and even still more further preferably at least 95 wt %. Most preferably the structuring fat essentially consists of structuring fat of vegetable origin.

To optimize the structuring capacity and/or impression of the spread in the mouth structuring fats having a certain solid fat content are preferred. Therefore, the structuring fat as present in the solid particles preferably has a solid fat content N10 from 50 to 100%, N20 from 26 to 95% and N35 from 5 to 60%.

The structuring fat as present in the solid particles preferably has a solid fat content N10 selected from the list consisting of 45 to 100%, 55 to 90% and 65 to 85%, N20 selected from the list consisting of 25 to 80%, 40 to 70% and 45 to 65%, N35 selected from the list consisting of 0.5 to 60%, 0.5 to 20%, 0.5 to 14%, 15 to 50% and 30 to 45%.

Preferred solid fat content profiles of the structuring fat as present in the solid particles are:
N10 from 45 to 100%, N20 from 25 to 80% and N35 from 0.5 to 60%;
N10 from 55 to 90%, N20 from 40 to 70% and N35 from 0.5 to 20%;
N10 from 55 to 90%, N20 from 40 to 70% and N35 from 15 to 50%;
N10 from 65 to 85%, N20 from 45 to 65% and N35 from 0.5 to 14%; and
N10 from 65 to 85%, N20 from 45 to 65% and N35 from 30 to 45%.

Cryogenic Spray Crystallization

The solid particles according to the invention are prepared by
preparing a molten mixture comprising the structuring agent;
subjecting the molten mixture to a first pressure P1;
expanding said mixture by spraying it through an orifice to an environment having a second pressure P2 thereby atomizing the molten mixture; and
contacting the atomized molten mixture with a cryogenic cooling medium.

The molten mixture comprises the structuring agent and if present the other ingredients that form the solid particle. The molten mixture may include processing aids. However, such processing aids will not be present in the formed solid particles or will at least be essentially absent. Known processing aids are for example dissolved or dispersed gas to modify the viscosity of the molten mixture to aid the spraying process. Preferably the molten mixture does not contain processing aids and consists of the structuring agent and if present the other ingredients that form the solid particle.

The molten mixture is prepared by subjecting it to elevated temperatures. The temperature of the molten mixture should be such that the mixture can be sprayed through an orifice. Preferably the temperature is such that essentially all of the structuring agent is in a liquid state.

The molten mixture is subjected to a first pressure P1 and expanded by spraying it through an orifice to an environment having a second pressure P2 thereby atomizing the molten mixture. P1 is greater than P2. Preferably P2 equals the atmospheric pressure and preferably is about one bar. We have found that the suitability of the solid particles for structuring an oil containing dispersion depends on the pressure difference P1 minus P2. This pressure difference should be equal to or greater than 20 bar (i.e. P1 minus P2 should be at least 20 bar). Lower pressure differences result in solid particles that are not or less suitable for structuring an oil containing dispersion.

Preferably P1 minus P2 is equal to or greater than 25 bar, more preferably equal to or greater than 40 bar, even more preferably equal to or greater than 55 bar, further more preferably equal to or greater than 70 bar, even further more preferably equal to or greater than 85 bar, still more preferably equal to or greater than 100 bar and even still more preferably equal to or greater than 150 bar.

Preferably P1 minus P2 is lower than 300 bar, more preferably lower than 250 bar, even more preferably lower than 200 bar and still even more preferably lower than 150 bar.

The atomized molten mixture is contacted with a cryogenic cooling medium thereby crystallizing the structuring agent. By contacting the atomized molten mixture with a cryogenic cooling medium the atomized molten mixture is rapidly converted into solid particles. Cryogenic cooling medium is defined as a liquid with a temperature below minus 150 degrees Celsius. Preferably the cryogenic cooling medium is liquid nitrogen.

To optimize the conversion of the atomized molten mixture into solid particles preferably the atomized molten mixture is sprayed into a field of cryogenic cooling medium. The field of cryogenic cooling medium may for example be created by introducing the cryogenic through a spray ring at a downward angle in a conical spray pattern converging on the stream of atomized molten mixture.

We have found that the solid particles obtained by the process according to the invention have unique properties that are different from the properties of solid particles obtained utilizing know process conditions. Without wishing to be bound by theory it may be that the specific process conditions result in solid particles with a unique physical structure. Therefore, the invention also relates to solid particles obtainable by the spray crystallization process according to the invention.

Structuring Oil Containing Dispersions

Oil containing dispersions, like for example spreads, made with solid particles obtainable by the process according to the invention show improved properties like for example hardness, spreadability, absence of free water after spreadability and ability to withstand temperature cycling.

Therefore in a further aspect the invention relates to the use of the solid particles according to the present invention for structuring an oil containing dispersion. Preferably the dispersion is an edible dispersion. Preferably the dispersion further comprises an aqueous phase and more preferably the dispersion is a water in oil emulsion comprising from 5 to 80 wt % fat, preferably 10 to 60 wt % and more preferably from 20 to 40 wt %. Preferably the emulsion is a fat continuous spread.

The amount of solid particles used for structuring an oil containing dispersion is suitably chosen such that the required structuring (i.e. stable dispersion like for example a stable emulsion) is obtained. It will be appreciated that the amount of solid particles depends on the amount of structuring fat in the solid particles and the desired amount of structuring fat on total product. Preferably the amount of structuring fat on total amount of product is 1 to 20 wt %, more preferably 2 to 15 wt % and even more preferably 4 to 12 wt %.

A suitable process is for example a process for the preparation of an edible fat continuous spread comprising an aqueous phase, comprising the steps of:
a. mixing fat powder and oil wherein the fat powder comprises structuring fat to provide a slurry;
b. providing an aqueous phase;
c. mixing the slurry and aqueous phase to form an oil continuous emulsion;
wherein the fat powder are edible solid particles according to the invention.

Preferably the slurry is kept at a temperature equal to or below 25 degrees Celsius, and the aqueous phase is cooled prior to mixing to such an extent that the temperature of the mixture of slurry and aqueous phase is kept equal to or below 25 degrees Celsius.

Another suitable process is for example a process for the preparation of an edible fat continuous spread comprising an aqueous phase comprising the steps of:
a. providing an aqueous phase containing all the ingredients except for the edible fat powder;
b. mixing the aqueous phase and the edible fat powder to form a continuous emulsion;
wherein the fat powder are edible solid particles according to the invention.

Preferably the aqueous phase is cooled prior to mixing to such an extent that the temperature of the mixture of the edible fat powder and aqueous phase is kept equal to or below 25 degrees Celsius.

Preferably the spread comprises from 5 to 50 wt % fat, more preferably 10 to 35 wt % and most preferably 15 to 30 wt %.

The oil in the slurry or in the aqueous phase is liquid oil and may be single oil or a mixture of different oils, and may comprise other components. Preferably at least 50 wt % of the oil (based on total amount of oil) is of vegetable origin, more preferably at least 60 wt %, even more preferably at least 70 wt %, still more preferably at least 80 wt %, even still more preferably at least 90 wt % and even still more further preferably at least 95 wt %. Most preferably the oil essentially consists of oil of vegetable origin.

The invention is now illustrated by the following non limiting examples.

EXAMPLES

The solid particles must be analyzed within 4 weeks after production and if stored, must have been stored at a temperature of 5 degrees Celsius or lower. The fat powder may not be subjected to temperatures above 5 degrees Celsius to prevent modification of the solid particles. The solid particles may not be subjected to extensive vibrations or the like to prevent the free flowing density of the powder to be affected as suitably known to the skilled person.

Stevens Value

Stevens values give an indication about the hardness (also called firmness) of a product. The Stevens value is determined according to the following protocol.

Freshly prepared products are stabilized at 5 degrees Celsius. The hardness of the product is measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in gram.

Spreadability

Spreadability is determined according to the following protocol.

A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Free Water

After spreading a sample of a fat spread, the stability of the emulsion after spreading is determined by using indicator paper (Wator, ref 906 10, ex Machery-Nagel, DE) which develops dark spots where free water is adsorbed.

A stable product does not release any water and the paper does not change.

Very unstable products release free water easily and this is indicated by dark spots on the paper.

A six point scale is used to quantify the quality of fat spread (DIN 10 311):
0 (zero) is a very stable and good product;
1 (one) is showing some loose moisture (one or two spots, or the paper changes a little in color as a total);
2 (two) as one but more pronounced;
3 (three) as one but to an almost unacceptable level;
4 (four) indicator paper is almost fully changing into a darker color;
5 (five) the paper changes completely and very fast into the maximum level of color intensity.

Spreads with a score of 4 or 5 are rejected for their stability. Spreads with a score of 0 or 1 show an acceptable quality with respect to free water.

Water Droplet Size Distribution of Spreads (D3,3 Measurement)

The normal terminology for Nuclear Magnetic Resonance (NMR) is used throughout this method. On the basis of this method the parameters D3,3 and exp($\sigma$) of a lognormal water droplet size distribution can be determined. The D3,3 is the volume weighted mean droplet diameter and σ is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and σ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

The droplet size of the spread is measured, according to the above described procedure, of a spread stabilized at 5 degrees Celsius right after production for one week. This gives the D3,3 after stabilization at 5 degrees Celsius.

The tube containing the small amount of product, 0.66 gram, is then stored for about 20 hours at 30 degrees Celsius, followed by stabilizing at 5 degrees Celsius for at least one hour. The droplet size is then measured to give the D3,3 after heat stability test at 30 degrees Celsius and re-stabilization at 5 degrees Celsius.

Solid Fat Content (SFC) Measurements

The solid fat content (SFC) in this description and claims is expressed as N-value, as defined in Fette, Seifen Anstrichmittel 80 180-186 (1978). The stabilization profile applied is heating to a temperature of 80 degrees Celsius, keeping the oil for at least 10 minutes at 60 degrees Celsius or higher, keeping the oil for 1 hour at 0 degrees Celsius and then 30 minutes at the measuring temperature.

Preparation of Solid Particles

Solid particles were prepared by cryogenic spray crystallization using the following set-up and according to the protocol as below. The results can be found in Table 1. The solid particles were made with ines48 as the structuring fat. inES48 is an interesterified mixture of 65% dry fractionated palm oil stearin with an Iodine Value of 14 and 35% palm kernel oil.

Spray Crystallization Set-Up

FIG. 1 is a schematic representation of the spray crystallization set-up containing: an autoclave (1) of about 600 ml connected to an orifice (2) (ex Spray Systems SK nozzle, core 80, insert 16); an expansion vessel (3) of about 0.25 m³ with a gas exhaust (4) provided with a filter to prevent solid particles to escape; a tubular spray ring (5) having an inner tube diameter of 8.8 mm and ring diameter of 20.5 cm with 8 equidistant holes of 1.4 mm diameter, the sprays are directed towards the atomized liquid mixture (6) at a downward angle of 45° with respect to the horizontal plane; liquid nitrogen (LN2) is led into the tubular spray ring via inlet (7); the spray ring has an exit valve (8) to promote rapid filling; the solid particles are collected in bin (9).

Solid Particles

About 300 gram of melted structuring fat was put into the autoclave which was thermostatted at about 60 degrees Celsius. The autoclave was then pressurised to obtain the target pressure P1 with compressed nitrogen (N2). The exit valve of the spray ring was opened to start the LN2 flow. As soon as the ring was filled the exit valve was almost closed to enforce a steady spray of LN2 via the holes into the expansion vessel.

When the temperature in the expansion vessel reached about minus140 degrees Celsius the valve between the autoclave and the orifice was opened to start the spraying of the fat (i.e. atomizing the molten fat mixture).

The expansion vessel remained at atmospheric pressure (P2). The temperature in the expansion vessel was monitored during the spraying and was always below about minus 120 degrees Celsius.

TABLE 1

Solid particles

| Example | Pressure before orifice (P1) (bar) | Free flowing bulk density (gram/liter) |
|---------|-----------------------------------|----------------------------------------|
| C-1     | 5 bar                             | 560                                    |
| C-2     | 6 bar                             | 555                                    |
| C-3     | 18 bar                            | 435                                    |
| 1       | 25 bar                            | 350                                    |
| 2       | 100 bar                           | Not measured                           |

Preparation of Spreads

Spreads with a composition as in Table 2 were made according to the methods as described below using the solid particles of examples C1-C3, 1 and 2.

TABLE 2

Fat Spread composition

|  | Composition (parts) |
|---|---|
| AQUEOUS PHASE |  |
| water | 69.497 |
| Sodium chloride | 0.250 |
| citric acid (pH = 4.5) | 0.003 |
| TOTAL | 69.750 |
| FAT PHASE |  |
| Sunflower oil | 25.660 |
| Edible particles | 4.240 |
| Emulsifier (Dimodan HP) | 0.100 |
| Colorant | 0.150 |
| Flavor | 0.100 |
| TOTAL | 30.250 |

Dimodan HP: molecularly distilled mono/diacylglyceride mixture derived from fully hardened palm oil (90% monoglyceride) ex Danisco, DK

TABLE 3

Spreads and solid particles used

| Spread example no | Solid particles example no | Spreads Process used |
|---|---|---|
| C-1 | C-1 | A |
| C-2 | C-2 | B |
| C-3 | C-3 | B |
| 1   | 1   | A |
| 2   | 2   | B |

Spreads Process A

For each of example 1 and comparative example C-1, 5 kg spread was prepared as follows.

(1) All aqueous phase ingredients (the water at a temperature of 15 degrees Celsius), the edible particles (i.e. fat powder), colorant, flavor and 23.660 parts of sunflower oil (with a temperature of 8 degrees Celsius) were mixed in a storage bowl (connected with a Huber cryostat type HS40 to cool the ingredient mixture) of a homogenizer (FrymaKoruma type MZM/VK-7 equipped with a reflux loop).

(2) The mixture was de-aerated at 100 mbar while stirring.
(3) Full speed homogenising by using the reflux loop, was performed for about one minute until a temperature of about 19 degrees Celsius was reached.
(4) A stock solution of the molten emulsifier in the remainder of the sunflower oil (approximately 60 degrees Celsius) was added. Homogenisation was started again until a final temperature of about 24 degrees Celsius was obtained.
(5) Homogeneous water in oil emulsions were obtained and samples were tapped. The samples were stored at 5 degrees Celsius.

Spreads Process B

For each of example 2 and comparative examples C-2 and C-3, 10 kg spread was prepared as follows.

First a fat slurry was prepared followed by the aqueous phase. The slurry and aqueous phase were mixed up in a continuously operating mixing system using two feed pumps, by pumping both streams together in the required ratio, into a pin stirrer having a volume of 75 ml operating at 2800 rotations per minute (see Table 4 for details). Homogeneous water in oil emulsions were obtained.

Fat Slurry:
(1) First 23.66 parts of the sunflower oil of 18 degrees Celsius was added to the storage bowl (connected with a Huber cryostat type HS40 to cool the ingredient mixture) of a homogeniser (FrymaKoruma type MZM/VK-7 equipped with a reflux loop) and cooled at 18 degrees Celsius. A stock solution of the molten emulsifier in the remainder of the sunflower oil (about 60 degrees Celsius) was added, followed by the edible particles (i.e. fat powder).
(2) The mixture was stirred and de-aerated for about 10 minutes followed by addition of the colorant and flavor.
(3) The mixture was homogenised for about 1 to 2 minutes under 100 mbar vacuum via the reflux until a temperature of about 23 degrees Celsius was reached.
(4) The reflux via the homogeniser was stopped and the mass was stirred under constant vacuum until the temperature was about 17 degrees Celsius.
(5) The fat slurry was taken and poured into the fat feed tank of the spreads production line. The fat feed tank was a small funnel of about 0.5 liters, mounted on top of the inlet opening of the slurry pump. The inlet pipe diameter (ca. 20 mm) of the pump was sufficiently big to facilitate the flow of the viscous mass of the inlet stream.

Aqueous Phase Preparation:

The aqueous phase was prepared by adding the salt to cold water of about 18 degrees Celsius followed by adjustment of the pH with citric acid. The resulting aqueous phase was poured into a double-walled stainless steel tank equipped with a stirrer and thermostatted at 18 degrees Celsius.

Spreads Production:

The spreads were prepared by pumping the content of the fat feed tank and of the aqueous phase feed tank, at rates of 4.32 and 9.95 kg per hour respectively, via a junction into a 75 ml double walled stainless steel pin stirrer with two rows of 4 stator and rotor pins.

First the fat phase was pumped into this system to fill it completely. Then both phases were pumped into the system simultaneously at the required ratio using 2 mohno pumps (Hanning Co.). After the junction point the mixture was pumped at about 14.3 kg/h into the pin stirrer, which results in a residence time of 19 seconds in the stirrer. The pin stirrer was thermostatted at about 21 degrees Celsius and operated at 2800 rpm.

The final product was filled into 150 ml plastic tubs and stored at 5 degrees Celsius.

TABLE 4

Spreads processing conditions for spread example 2 and comparative spread examples C-2 and C-3

| Ex. | Flow fat phase (kg/hr) | Flow aqueous phase (kg/hr) | Temp. fat phase # (° C.) | Temp. aqueous phase # (° C.) | Temp. pin stirrer in (° C.) | Temp. pin stirrer out (° C.) |
|---|---|---|---|---|---|---|
| C-2 | 4.32 | 9.95 | 20 | 18 | 23.3 | 24.2 |
| C-3 | 4.32 | 9.95 | 20 | 18 | 22.8 | 24.2 |
| 2 | 4.32 | 9.95 | 20 | 18 | 24.5 | 24.8 |

As measured in the feed tank.

Results

The hardness, spreadibility, free water and the droplet size (D3,3) after stabilization at 5 degrees Celsius as well as after a heat stability test at 30 degrees Celsius and re-stabilization at 5 degrees Celsius was determined for each of the spreads according to the methods as described above. The results are summarized in Table 5.

TABLE 5

Spreads analyses

| Ex. | Hardness | Spreadi-bility | Free water | D3,3 5 degrees Celsius @ | D3,3 30/5 degrees Celsius @@ |
|---|---|---|---|---|---|
| C-1 | 74 | 4.5 | 5 | nm | Free water |
| C-2 | 64 | 4.5 | 5 | 29.1 | Free water |
| C-3 | 137 | 3 | 4 | 8.6 | 20.2 |
| 1 | 130 | 1.5 | 0 | 4.2 | 12.4 |
| 2 | 152 | 1.5 | 0.5 | 8.5 | 18.6 | nm—not measured
@ D3,3 determined after stabilization at 5 degrees Celsius.
@@ D3,3 determined after a heat stability test at 30 degrees Celsius and restabilization at 5 degrees Celsius Spreads prepared with solid particles prepared using the spray crystallisation according to the invention (examples 1 and 2) have better properties.

The invention claimed is:

1. Spray crystallization process for making solid particles suitable for structuring an oil containing dispersion, the process comprising:
   preparing a molten mixture comprising a structuring agent;
   subjecting the molten mixture to a first pressure P1;
   expanding said mixture by spraying it through an orifice to an environment having a second pressure P2 thereby atomizing the molten mixture; and
   contacting the atomized molten mixture with a cryogenic cooling medium;
   wherein P1 is greater than P2 and wherein P1 minus P2 is equal to or greater than 20 bar.

2. Process according to claim 1 wherein the structuring agent comprises structuring fat, preferably the structuring agent consists of one or more structuring fats.

3. Process according to claim 2 wherein the structuring fat has a solid fat content N10 from 50 to 100%, N20 from 26 to 95% and N35 from 5 to 60%.

4. Process according to claim 1 wherein the solid particles are an edible fat powder.

5. Process according to claim 1 wherein the solid particles comprise at least 80 wt % structuring fat.

6. The process according to claim 5 wherein the solid particles comprise at least 90 wt % structuring fat.

7. The process according to claim 6 wherein the solid particles comprise at least 98 wt % structuring fat.

8. The process according to claim 5 wherein the solid particles essentially consist of structuring fat.

9. Process according to claim 1 wherein P1 minus P2 is equal to or greater than 25 bar.

10. Process according to claim 1 wherein the cryogenic cooling medium is liquid nitrogen.

11. Process according to claim 1 wherein the atomized molten mixture is sprayed into a field of cryogenic cooling medium.

12. Process according to claim 1 wherein the solid particles have a free flowing bulk density at 5 degrees Celsius of at least 100 gram/liter.

13. Process according to claim 12 wherein the solid particles have a free flowing bulk density at 5 degrees Celsius of at least 200.

14. Process according to claim 1 wherein P1 minus P2 is equal to or greater than 85 bar.

* * * * *